(12) United States Patent
Choi (10) Patent No.: US 9,716,671 B2
(45) Date of Patent: Jul. 25, 2017

(54) PROVIDER BRIDGED NETWORK COMMUNICATION

(75) Inventor: Byung Kyu Choi, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 23 days.

(21) Appl. No.: 14/391,820

(22) PCT Filed: Jul. 30, 2012

(86) PCT No.: PCT/US2012/048767
§ 371 (c)(1),
(2), (4) Date: Oct. 10, 2014

(87) PCT Pub. No.: WO2014/021810
PCT Pub. Date: Feb. 6, 2014

(65) Prior Publication Data
US 2015/0341286 A1 Nov. 26, 2015

(51) Int. Cl.
| G06F 15/16 | (2006.01) |
| H04L 12/931 | (2013.01) |
| H04L 29/08 | (2006.01) |
| H04L 12/46 | (2006.01) |

(52) U.S. Cl.
CPC .......... *H04L 49/354* (2013.01); *H04L 12/462* (2013.01); *H04L 12/4633* (2013.01); *H04L 12/4641* (2013.01); *H04L 67/10* (2013.01)

(58) Field of Classification Search
None
See application file for complete search history.

(56) References Cited

U.S. PATENT DOCUMENTS

| 7,787,480 B1 | 8/2010 | Mehta et al. |
| 7,792,087 B2* | 9/2010 | Monden ............ H04L 12/5692 370/338 |
| 7,924,880 B2 | 4/2011 | Teng |
| 8,509,248 B2* | 8/2013 | Mehta ............... H04L 12/462 370/389 |
| 8,599,850 B2* | 12/2013 | Jha .................. H04L 12/4625 370/390 |

(Continued)

FOREIGN PATENT DOCUMENTS

| CN | 101184017 A | 5/2008 |
| CN | 101442467 A | 5/2009 |

(Continued)

OTHER PUBLICATIONS

Nitin Jain, PBB-TE: A Carrier Ethernet Technology, 2011, <http://www.Intinfotech.com/white_papers/pes/A%20Carrier%20Ethernet%20Technology_P>.

(Continued)

*Primary Examiner* — Joshua Joo
(74) *Attorney, Agent, or Firm* — Hewlett Packard Enterprise Patent Department (57) ABSTRACT

According to an example, a method for provider bridged network communication includes receiving traffic including a source and a destination address at a first virtual local area network (VLAN) for redirection to a second VLAN. The method further includes forwarding the traffic based on the source and the destination address to a provider edge bridge (PEB) of the first VLAN, and forwarding, by a processor, the traffic from the PEB of the first VLAN to a PEB of the second VLAN.

17 Claims, 8 Drawing Sheets

(56) References Cited

U.S. PATENT DOCUMENTS

| | | | |
|---|---|---|---|
| 8,755,383 B2* | 6/2014 | Keesara | H04L 45/66 370/389 |
| 8,976,791 B1* | 3/2015 | Sivan | H04L 12/4625 370/392 |
| 9,100,198 B2* | 8/2015 | Goli | |
| 2002/0091795 A1 | 7/2002 | Yip | |
| 2003/0142674 A1* | 7/2003 | Casey | H04L 12/4633 370/393 |
| 2004/0044754 A1* | 3/2004 | Virdy | H04L 12/462 709/223 |
| 2004/0066780 A1* | 4/2004 | Shankar | H04L 12/4645 370/389 |
| 2004/0111520 A1* | 6/2004 | Krantz | H04L 63/08 709/229 |
| 2004/0165600 A1* | 8/2004 | Lee | H04L 12/4645 370/395.53 |
| 2004/0174828 A1* | 9/2004 | Elie-Dit-Cosaque | H04L 12/4625 370/254 |
| 2004/0174887 A1* | 9/2004 | Lee | H04L 12/462 370/395.53 |
| 2004/0221042 A1* | 11/2004 | Meier | H04L 12/4625 709/227 |
| 2006/0245439 A1 | 11/2006 | Sajassi | |
| 2006/0248227 A1* | 11/2006 | Hato | H04L 12/4633 709/245 |
| 2008/0013547 A1 | 1/2008 | Klessig et al. | |
| 2010/0226381 A1* | 9/2010 | Mehta | H04L 12/465 370/401 |
| 2010/0306415 A1 | 12/2010 | Sultan et al. | |
| 2010/0309907 A1* | 12/2010 | Proulx | H04L 41/0806 370/389 |
| 2011/0069711 A1* | 3/2011 | Jha | H04L 12/4625 370/395.53 |
| 2012/0020206 A1* | 1/2012 | Busi | H04L 12/24 370/217 |
| 2012/0027014 A1 | 2/2012 | Mack-Crane et al. | |
| 2012/0063465 A1 | 3/2012 | Keesara et al. | |
| 2012/0327836 A1* | 12/2012 | Narayanasamy | H04W 76/022 370/312 |
| 2013/0156028 A1* | 6/2013 | Hernandez | H04L 12/4641 370/359 |
| 2013/0201979 A1* | 8/2013 | Iyer | H04W 84/12 370/338 |
| 2015/0003295 A1* | 1/2015 | Bottorff | H04L 12/4625 370/254 |
| 2016/0182254 A1* | 6/2016 | John | H04L 12/2874 370/392 |

FOREIGN PATENT DOCUMENTS

| | | |
|---|---|---|
| CN | 101800691 A | 8/2010 |
| EP | 2282453 A1 | 2/2011 |

OTHER PUBLICATIONS

Virtual Bridge Local Area Networks, Amendment 4: Provider Bridges, IEEE Computer Society 802.1ad, May 26, 2006.
European Patent Office, "Extended European Search Report", PCT/US2012/048767, Feb. 16, 2016, 8 pages.

* cited by examiner

PROVIDER BRIDGED NETWORK COMMUNICATION

BACKGROUND

Large scale networks typically include wireless access points (APs) strategically located to provide user access to the internet or an intranet. For universities and other such facilities, users are often registered with a home network, and the APs are used to redirect users from a location in the network away from the users' home network to their home network. Such networks therefore need technical capabilities, such as, allowing mobile users to register, recognizing data traffic from wireless mobile users, and redirecting the data traffic to the users' home network in a seamless manner. Once a user is in his/her home network, the data traffic from the user can be bridged and routed as if it originated from the home network.

Wireless controllers can be used to route data traffic from APs to users' home network. However, for large scale networks that can include thousands of users and APs, the wireless controllers can become a source of congestion as data traffic is first routed to the wireless controllers from various APs and then to the users' home network. While more wireless controllers can be added to a large scale network to reduce such congestion, such a solution can be expensive. Such a solution can also limit scalability if more wireless controllers need to be continuously added to meet increasing demand.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For large scale networks, such as university campus networks, that typically include wireless APs strategically located to provide user access, data traffic redirection can be challenging. For such networks, APs are used to redirect data traffic from users located at any given location in the network to home networks at which the users are registered. Alliteratively, the APs are used to redirect data traffic from users' home networks to any given location in the network based on the users' locations. For such networks, a new class of forwarding is needed to redirect data traffic from users away from the users' home network, to the users' home network. The forwarding also needs to be compatible with existing standard network protocols, and readily implementable without imposing a significant overhead on the forwarding architecture of existing switches.

A provider bridged network communication (PBNC) system and method are described. The PBNC system and method provide a comprehensive solution for traffic redirection for a large scale networks. For the PBNC system and method based network (hereinafter PBNC network), data traffic may be forwarded from a user at any given virtual local area network (VLAN) to another, to the user's home VLAN. A user at a VLAN away from the user's home VLAN may be considered a visitor or visiting user by the PBNC network. The PBNC network may include customer VLANs (C-VLANs) and service-VLANS (S-VLANs) for traffic redirection as traffic is forwarded from one VLAN to another. C-VLANs may request S-VLANs to forward traffic to another C-VLAN. Likewise C-VLANs may receive and process traffic. A S-VLAN forwards traffic from one VLAN to another, which thus provides traffic redirection. A VLAN may function as a C-VLAN and a S-VLAN. The C-VLANs and S-VLANs may include provider edge bridge (PEB) components to bridge different VLANs. The bridging in the S-VLAN is performed based on a S-TAG and a pair of source and destination Media Access Control (MAC) addresses. The bridging in the C-VLAN is performed based on a C-TAG and a pair of source and destination MAC addresses. The PEB component may also serve the role of a home location register (HLR) and visiting location register (VLR). The C-VLANs and S-VLANs may also include a plurality of associated wireless access points (APs). The APs support encapsulation and decapsulation for a visiting user. To retrieve the home VLAN information, the APs may access registration information for a user. The APs may thus retrieve permanent registration information, use dynamic association information of mobile users, and encapsulate the traffic from a visiting user with an appropriate S-TAG. The PBNC system and method provide a framework of traffic redirection, utilizing, for example, the Ethernet technology, IEEE 802.1ad.

According to an example, the PBNC method includes receiving traffic including a source and a destination address at a first VLAN for redirection to a second VLAN. The method further includes forwarding the traffic based on the source and the destination address to a PEB of the first VLAN, and forwarding, by a processor, the traffic from the PEB of the first VLAN to a PEB of the second VLAN. The traffic may be received at an AP of the first VLAN. The method further includes encapsulating the traffic with a tag representing the first VLAN, and forwarding the traffic based on the encapsulation, and the source and the destination address, to the PEB of the first VLAN. The AP of the first VLAN may be used to encapsulate the traffic. The method further includes decapsulating the traffic to remove the tag representing the first VLAN, and forwarding the traffic based on the source and the destination address to an AP of the second VLAN. The PEB of the second VLAN may be used to decapsulate the traffic.

The PBNC system and method provide a comprehensive solution to traffic redirection in the form of the PBNC network. The PBNC network provides traffic redirection from one VLAN to another based on a provider bridged network (PBN). Since the PBNC network collectively maintains user location information, multicasting is seamlessly supported without introducing other proprietary protocol suits. The PBNC system and method also eliminate the need for a visiting network to know a home network address, where PEB components in each VLAN can retrieve such information. This provides scalability, without the need to add hardware resources, such as additional wireless controllers. For example, the PBNC system and method allow each intermediate switch of a visiting network to maintain a home network address by learning the home address on demand.

Figure 1:
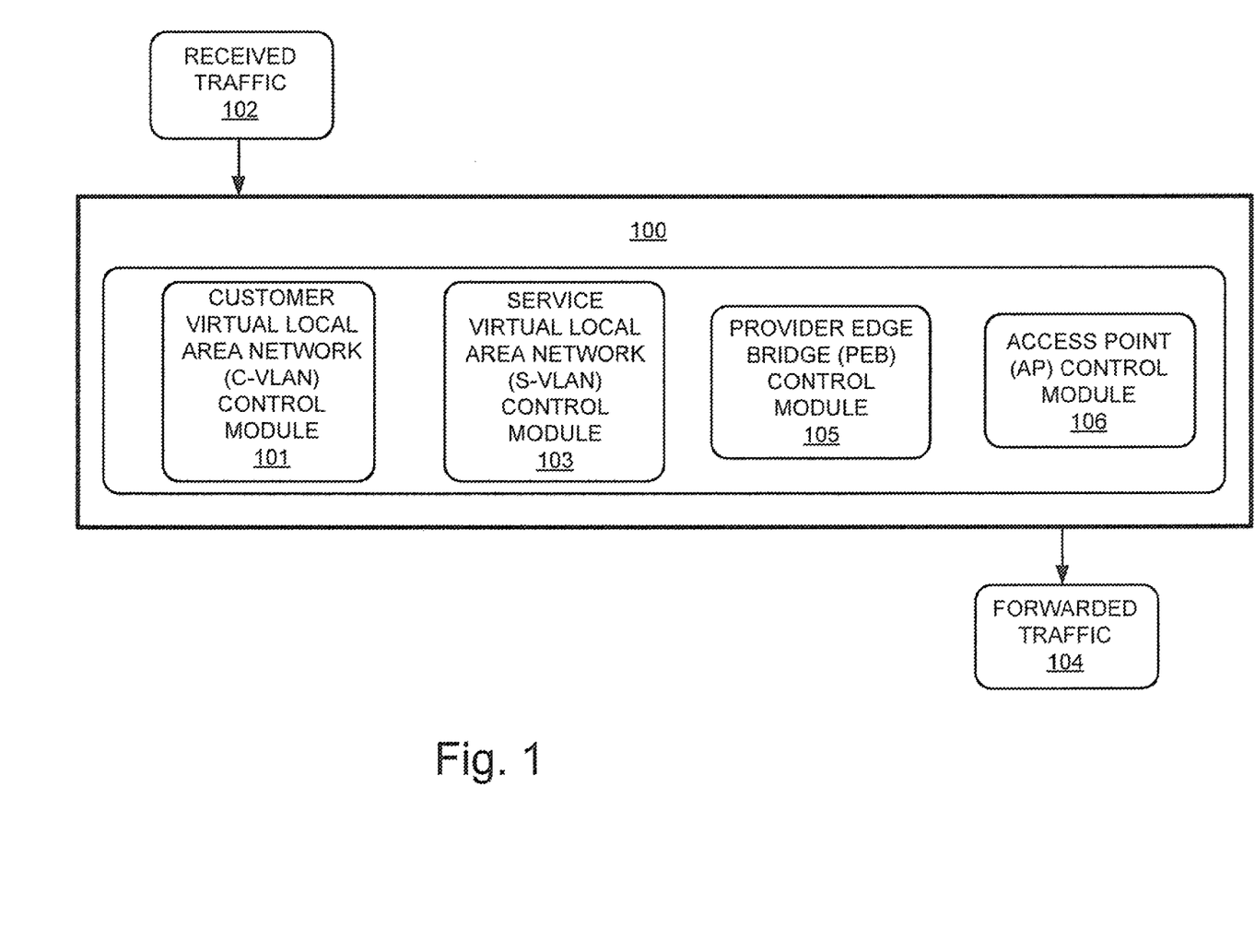
FIG. 1 illustrates an architecture of a provider bridged network communication (PBNC) system, according to an example of the present disclosure.

FIG. 1 illustrates an architecture of a provider bridged network communication (PBNC) system 100, according to an example. Referring to FIG. 1, the system 100 is depicted as including a C-VLAN control module 101 to provide C-VLAN functionality for a VLAN, for example, to receive and process traffic 102. A S-VLAN control module 103 is to provide S-VLAN functionality for a VLAN, for example, to forward traffic 104 from one VLAN to another, which thus provides traffic redirection. A PEB control module 105 is to monitor and control the functionality of a PEB, for example, to bridge different VLANs. An AP control module 106 is to monitor and control the functionality of an AP, for example, to retrieve permanent registration information, use dynamic association information of mobile users, and to encapsulate traffic from a visiting user with an appropriate S-TAG.

The modules 101, 103, 105 and 106, and other components of the system 100 that perform various other functions in the system 100, may comprise machine readable instructions stored on a computer readable medium. In addition, or alternatively, the modules 101, 103, 105 and 106, and other components of the system 100 may comprise hardware or a combination of machine readable instructions and hardware.

Figure 2:
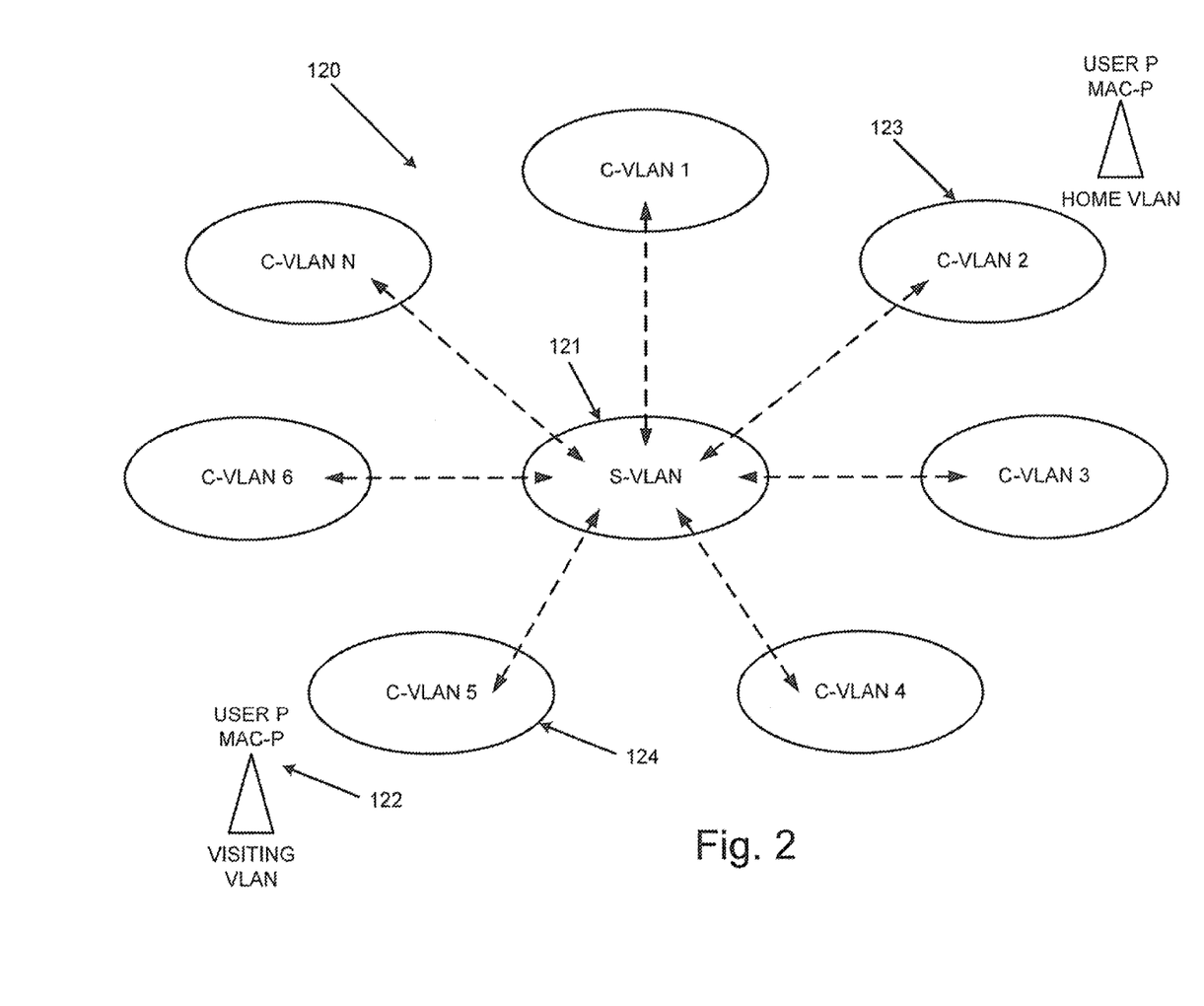
FIG. 2 illustrates a diagram of a PBNC network layout for the PBNC system, according to an example of the present disclosure.

Referring to FIG. 2, a model of a PBNC network 120 is illustrated, for example, for a university campus network. The PBNC network 120 includes C-VLANs 1-N and a S-VLAN 121 for traffic redirection as data traffic is forwarded from one C-VLAN to another. For the PBNC network 120, a home C-VLAN of a user-P at 122 is C-VLAN 2 at 123. In the FIG. 2 example, user-P is located at C-VLAN 5 at 124. The PBNC system 100 redirects any data traffic from user-P at the C-VLAN 5 to the home C-VLAN 2 via the S-VLAN. The S-VLAN forwards the data traffic from one C-VLAN to another, which thus provides traffic redirection. Routing intervenes whenever user-P visits another C-VLAN of the PBNC network 120.

Figure 3:
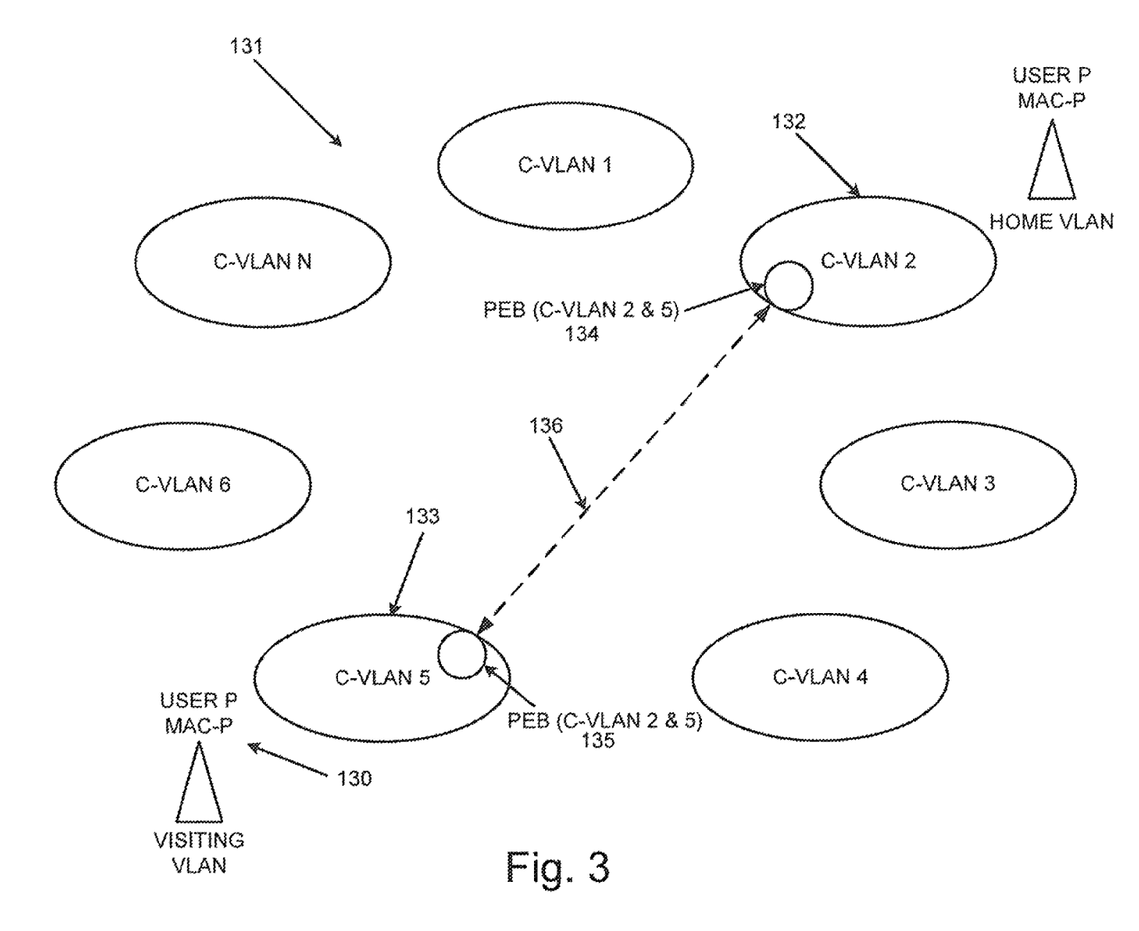
FIG. 3 illustrates a diagram of a PBNC network layout for the PBNC system including provider edge bridge (PEB) components, according to an example of the present disclosure.

FIG. 3 shows a case of a user-P at 130 in the context of a PBNC network 131, for further describing S-VLAN functionality. FIG. 3 generally includes C-VLANS 1-N. The C-VLANS 1-N also functions as S-VLANS as discussed below. For home C-VLAN 2 at 132 and C-VLAN 5 at 133, the C-VLANs support two PEB components. One PEB component 134 is provided for the C-VLAN 2 and another PEB component 135 is provided at the C-VLAN 5. The PEB components 134 and 135 are members of both the C-VLAN 2 and the C-VLAN 5. Therefore both of the PEB components may receive communication from and communicate with both the C-VLAN 2 and the C-VLAN 5. For FIG. 3, each user is a permanent member of the home VLAN. Therefore, the mapping between a user-P and the home C-VLAN 2 is permanent regardless of the current geographic location of the user-P.

The media access control (MAC) address of the user-P (i.e., MAC: USER P") in the visiting C-VLAN 5 is a member of the C-VLAN 2. In order to forward data traffic, the data traffic from the user-P at 130 in the C-VLAN 5 includes the following three components: a pair of MAC addresses (i.e., MAC: USER P as the source MAC, and, MAC: home VLAN as the destination MAC), the home C-VLAN 2, and, the C-VLAN 5. For the C-VLAN 5, the pair of MAC addresses and the home C-VLAN 2 are encapsulated by the C-VLAN 5. The data traffic is first forwarded to the PEB component 135 of the C-VLAN 5. This forwarding is arranged by the pair of MAC addresses and the C-VLAN 5. The PEB component 135 of the C-VLAN 5 forwards the data traffic to the PEB component 134 of the home C-VLAN 2. The PEB component 134 of the home C-VLAN 2 first decapsulates a packet from the data traffic (i.e., removes the VLAN 5), and, forwards the packet to a home VLAN server. The reverse traffic from the home C-VLAN 2 to the user-P, currently visiting the C-VLAN 5, is forwarded in a similar way, where the position of the home C-VLAN 2 and the C-VLAN 5 in the packet header are switched.

Referring to FIG. 3, for the traffic forwarding example described above, the C-VLAN 5 functions as the S-VLAN for the traffic originated from the user-P, currently visiting the C-VLAN 5. The C-VLAN 5 also functions as the S-VLAN for the traffic, originated from elsewhere, headed for user-P, currently visiting the C-VLAN 5 at 133. A provider bridge 136, collectively called a provider bridged network (PBN) if there is a plurality of provider bridges, is a member of every C-VLAN of the PBNC network 131 that includes a PEB. The provider bridge 136 forwards a packet if the packet includes a valid C-VLAN address of the PBNC network 131.

Figure 4:
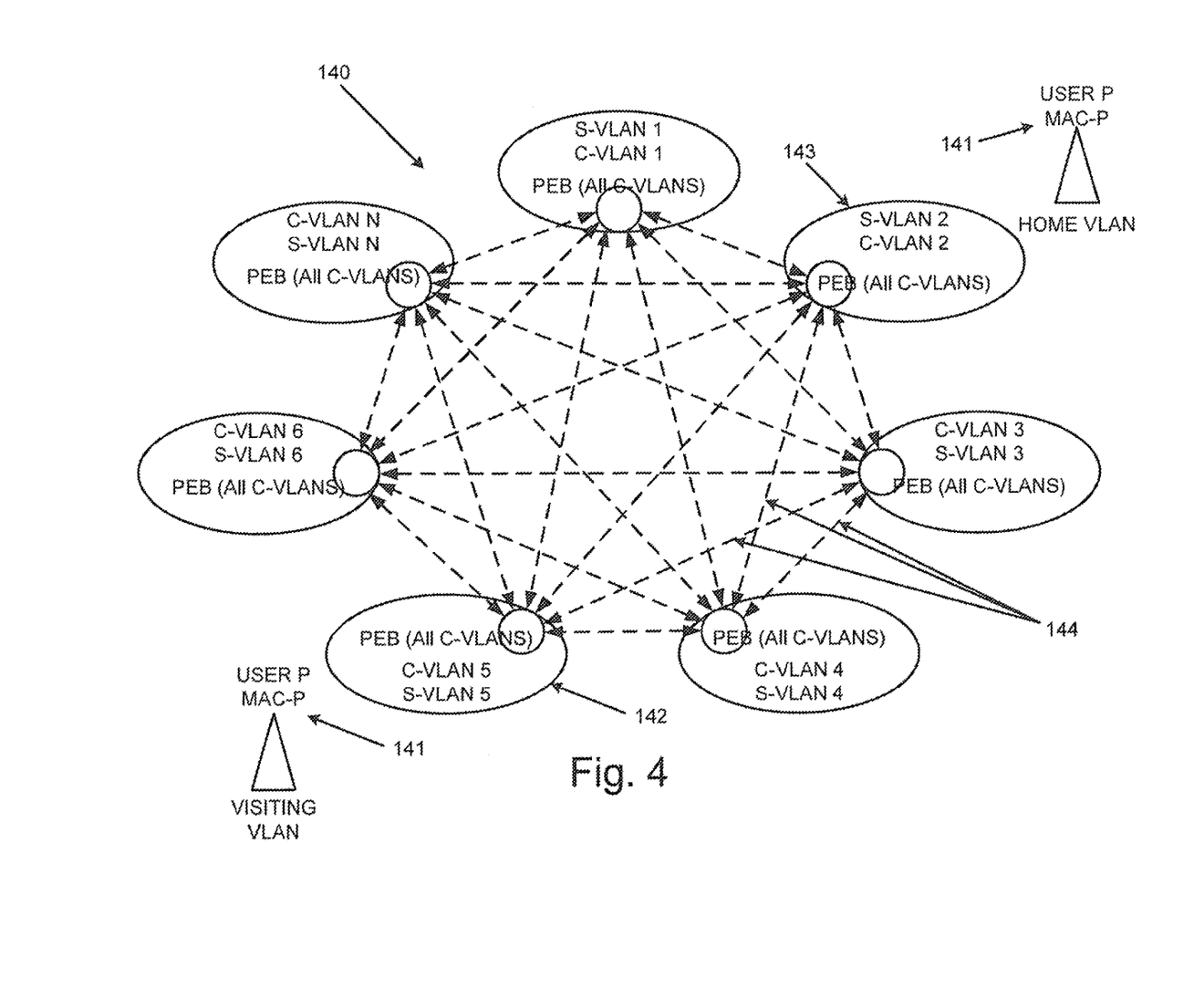
FIG. 4 illustrates another diagram of a PBNC network layout for the PBNC system including PEB components, according to an example of the present disclosure.

Referring to FIG. 4, a generalized PBNC network 140 including a plurality of C-VLANs that also function as S-VLANs, and PEB components, is illustrated. For example, for the generalized PBNC network 140, every C-VLAN has a PEB component, and each PEB component is a member of every other C-VLAN. Therefore, regardless of the current location of a user-P at 141, the PBNC network 140 can forward traffic that includes appropriate redirection information. As shown in FIG. 4, the user-P at 141 can be located at a visiting VLAN at 142 (i.e., C-VLAN 5/S-VLAN 5), and has a home VLAN at 143 (i.e., C-VLAN 2/S-VLAN 2). The user-P at 141 can also be located at the home VLAN at 143 for communication with other VLANs. Provider bridges 144 collectively form a PBN. Therefore, traffic can be redirected as needed by the PBNC network 140.

Referring to FIG. 4, an example of redirection scenarios (i.e., redirection scenario-1 and redirection scenario-2) are described. For the redirection scenarios, the legends are as follows:

$U_A$: A user (i.e., the user-P at 141), who uses a wireless mobile device and is permanently registered with a VLAN, $V_{home}$.

$V_{home}$: The home VLAN (i.e., the home VLAN at 143) of $U_A$.

$I_{regA}$: Information of the permanent registration of $U_A$ with $V_{home}$.

$V_{visit}$: The visiting VLAN (i.e., the visiting VLAN at 142) of $U_A$.

$AP_{visit}$: The wireless access point in the $V_{visit}$, through which the mobile user is currently attached to the PBNC network 140.

$I_{UAP}$: Information of the dynamic association between $U_A$ and $AP_{visit}$.

$PEB_{visit}$: The PEB-enabled switch (i.e., the PEB_enabled switch in the visiting VLAN at 142) in the $V_{visit}$.

$PEB_{home}$: The PEB-enabled switch (i.e., the PEB_enabled switch in the home VLAN at 143) in the $V_{home}$.

$T_{fromA}$: Traffic generated by $U_A$, currently visiting $V_{visit}$.

$T_{toA}$: Traffic headed for $U_A$, currently visiting $V_{visit}$.

PBN: The network (i.e., the PBNC network 140) formed by the PEB-enabled switches (i.e., PBN 144) and, if needed, PB (provider bridge) core switches on the main network.

Referring to FIG. 4, the redirection scenario-1 is directed to traffic redirection from $V_{visit}$ to $V_{home}$ (i.e., $V_{visit} \rightarrow V_{home}$). Redirection scenario-1 proceeds as follows, initially, $U_A$ is registered with $V_{home}$, and $I_{regA}$ is forwarded to $PEB_{home}$. If $U_A$ moves to $V_{visit}$, $U_A$ becomes associated with $AP_{visit}$. $AP_{visit}$ forwards $I_{UAP}$ to $PEB_{visit}$, and $PEB_{visit}$ forwards $I_{UAP}$ to $PEB_{home}$. Assuming $U_A$ starts a network application (e.g., web browsing, email, etc.), $U_A$ generates traffic $T_{fromA}$. $AP_{visit}$ forwards $T_{fromA}$ to $PEB_{visit}$. $PEB_{visit}$ forwards $T_{fromA}$ to $PEB_{home}$, and $PEB_{home}$ forwards $T_{fromA}$ to $V_{home}$. Finally, $V_{home}$ treats $T_{fromA}$ by regular bridging and routing as if $T_{fromA}$ were originated from $V_{home}$.

Referring to FIG. 4, the redirection scenario-2 is directed to traffic redirection from $V_{home}$ to $V_{visit}$ (i.e., $V_{visit} \leftarrow V_{home}$). Redirection scenario-2 proceeds as follows, $U_A$ is currently attached to $V_{visit}$ through $AP_{visit}$. $V_{home}$ receives traffic, $T_{toA}$, headed to $U_A$, currently visiting $V_{visit}$. $V_{home}$ forwards $T_{toA}$ to $PEB_{home}$, and $PEB_{home}$ forwards $T_{toA}$ to $PEB_{visit}$. $PEB_{visit}$ forwards $T_{toA}$ to $AP_{visit}$. $AP_{visit}$ forwards $T_{toA}$ to the wireless mobile device $U_A$ is currently using.

Figure 5:
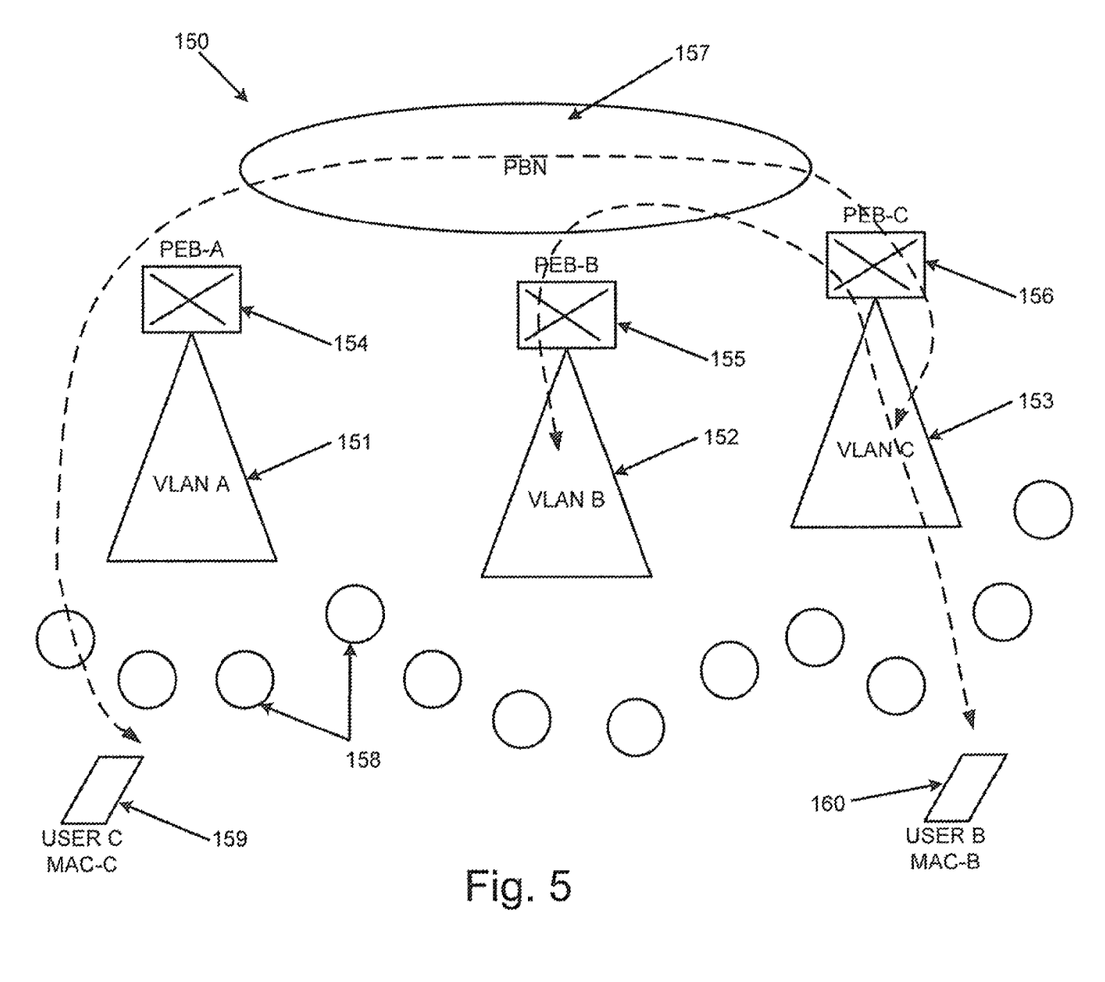
FIG. 5 illustrates an example of a PBNC network layout for the PBNC system including three virtual local area networks (VLANs), according to an example of the present disclosure.

Referring to FIG. 5, an example of the PBNC system 100 including three VLANs is illustrated. Specifically, PBNC network 150 of FIG. 5 shows VLAN A at 151, VLAN B at 152 and VLAN C at 153. Each of the VLANs respectively includes a PEB, namely, PEB A at 154, PEB B at 155, and PEB C at 156, that form a PBN 157. The PBNC network 150 includes access points (APs) 158, a user-C at 159, and a user-B at 160. The APs 158 may be partitioned and assigned to the VLANs A, B and C. The user-C may be permanently registered with the VLAN C, and the user-B may be permanently registered with the VLAN B. Based, for example, on the details provided for the redirection scenarios 1 and 2 with reference to FIG. 4, the traffic originated by the user-C is redirected to the VLAN C, which is the home VLAN of the user-C. Likewise, the traffic originated by the user-B is redirected to the VLAN B, which is the home VLAN of the user-B.

Figure 6:
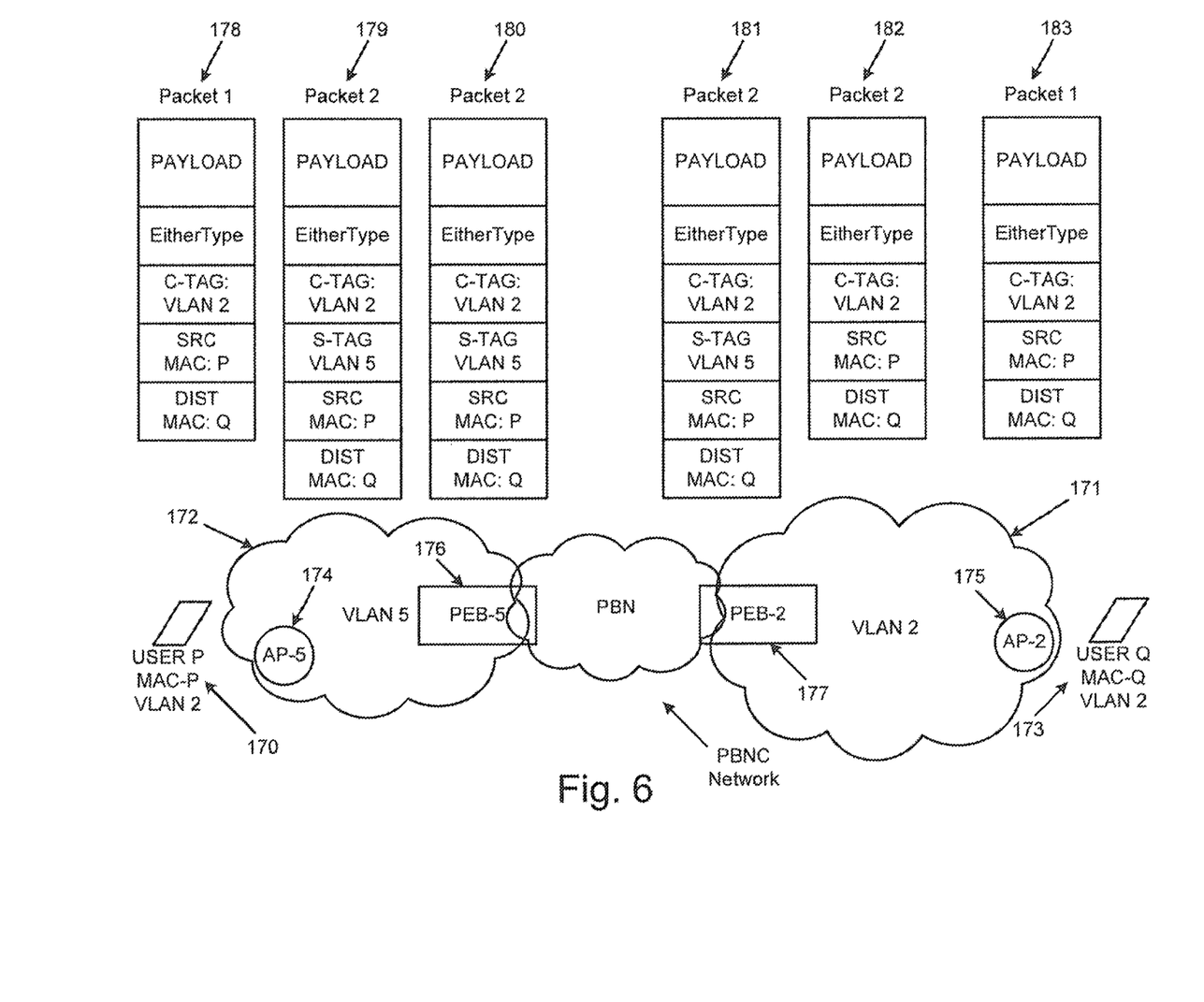
FIG. 6 illustrates an example of a packet format for the PBNC system, according to an example of the present disclosure.

Referring to FIG. 6, an example of packet formats for the PBNC system 100 is illustrated. Specifically, for the example of FIG. 6, a user-P at 170 of VLAN 2 at 171 is currently visiting VLAN 5 at 172 and communicating with another user-Q at 173 of the VLAN 2 at 171. The user-P is currently attached to the PBNC network through AP-5 at 174 in the VLAN 5. Likewise, the user-Q is attached to the PBNC network via AP-2 in the VLAN 2. PEB-5 at 176 represents the PEB component of the VLAN 5. PEB-2 at 177 represents the PEB component of the VLAN 2. The MAC addresses of the user-P and the user-Q are MAC-P and MAC-Q respectively.

For traffic from the user-P to the user-Q (i.e., from user-P→user-Q), initially, at 178, the user-P generates a packet (i.e., PACKET 1) with C-TAG (i.e., the VLAN 2), source MAC (i.e., MAC-P), and destination MAC (i.e., MAC-Q). At 179, the AP-5 receives PACKET 1 and encapsulates it with S-TAG (I.e., VLAN 5). In order to differentiate PACKET 1 from other packets whose home network is VLAN 5, AP-5 can inquire with a registry (i.e., PEB-5) when MAC-P first appears if MAC-P is a visiting MAC address. At 180, the encapsulated packet (i.e., PACKET 2) is subsequently forwarded to the PEB-5. Since VLAN 5 treats PACKET 2 based on the S-TAG and the pair of MAC addresses (i.e., MAC-P and MAC-Q), VLAN 5 effectively becomes the service VLAN for PACKET 1. From 180 to 181, PEB-5 receives PACKET 2, and forwards PACKET 2 to PEB-2. PEB-2 receives PACKET 2, and decapsulates it to PACKET 1, the original format by removing the S-TAG (i.e., VLAN 5). This is based on the determination that the VLAN-ID (i.e., VLAN 2) matches the C-TAG (i.e., VLAN-2). At 182, PEB-2 forwards PACKET 2 in its original format to AP-2. At 183, AP-2 receives PACKET 1 and forwards it to user-Q, and user-Q receives PACKET 1. For traffic from the user-Q to the user-P (i.e., from user-Q→user-P), the foregoing order from 178-183 is reversed.

The PBNC system 100 also supports multicasting where traffic can be delivered to multiple users simultaneously in a single transmission from a home VLAN. For example, the PEB component of each VLAN maintains the information of the home users, currently visiting another VLAN. Therefore, multicasting is supported regardless the current location of each member of a VLAN.

Referring to FIGS. 1, 2, 4 and 6 and the associated examples described above, each VLAN includes dual roles, one of a C-VLAN for its home users and a second of a S-VLAN for visiting users. The PEB components support all VLAN tags of a PBNC network to account for a user's mobility throughout the PBNC network. Based on the size of the PBNC network, provider core bridges may be used with a PBN. For example, for a large PBNC network with many VLANs, provider core bridges may be used, as opposed to a smaller network. Forwarding in the PBN may be performed based, for example, on an S-TAG and MAC addresses as described above. As discussed above with reference to FIG. 6, encapsulation (i.e., adding a S-TAG) and decapsulation (i.e., removing a S-TAG) are performed at the AP and the PEB component of the home VLAN. For example, for the example of traffic from the user-P to the user-Q (i.e., from user-P→user-Q), encapsulation is performed by AP-5 and decapsulation is performed by PEB-2. For the example of traffic from the user-Q to the user-P (i.e., from user-Q→user-P), encapsulation is performed by PEB-2, and decapsulation is performed by AP-5.

With regard to permanent registration (i.e., static ($I_{regA}$)) and dynamic association (i.e., dynamic ($I_{UAP}$)), referring to FIG. 6, each PEB component (i.e., PEB-2 and PEB-5) maintains the entire registration information of the VLAN it represents. For example, PEB-2 maintains the permanent registration (i.e., static ($I_{regA}$)) of VLAN 2 users that are registered to VLAN 2 as their home VLAN. Each PEB component also maintains all the dynamic association information ($I_{UAP}$). For example, PEB-2 also maintains all the dynamic association information (i.e., dynamic ($I_{UAP}$)) created by users visiting VLAN 2. Alternatively, as opposed to the PEBs, an external database (not shown) may be provided for maintaining both $I_{regA}$ and $I_{UAP}$. For the case of the external database, both $I_{regA}$ and $I_{UAP}$ may be forwarded to the external database upon creation. In the case of the external database, for redirection of traffic from the user-P to the user-Q or from the user-Q to the user-P, $I_{regA}$ and $I_{UAP}$ may be retrieved from the external database as needed.

The PBNC system 100 may include a forwarding table that is configured as follows. The forwarding table may support a total of $S_{total}$ unique MAC addresses by the home and visiting users. For example, if $S_{home}$ is defined as the size of unique MAC addresses of a C-VLAN, and $S_{visit}$ is defined as the size of unique MAC addresses of the S-VLAN, then $S_{total}=S_{home}+S_{visit}$, or $S_{total}=S_{home}+\Sigma_{K=1}^{N}S_{visitK}$. Here, $S_{visit}$ is defined by $\Sigma_{K=1}^{N}S_{visitK}$, where $S_{visit1}$ represents the visiting users from VLAN 1, $S_{visit2}$ represents the visiting users from VLAN 2, $S_{visitK}$ represents the visiting users from VLAN K, and $S_{visitN}$ represents the visiting users from VLAN N.

Figure 7:
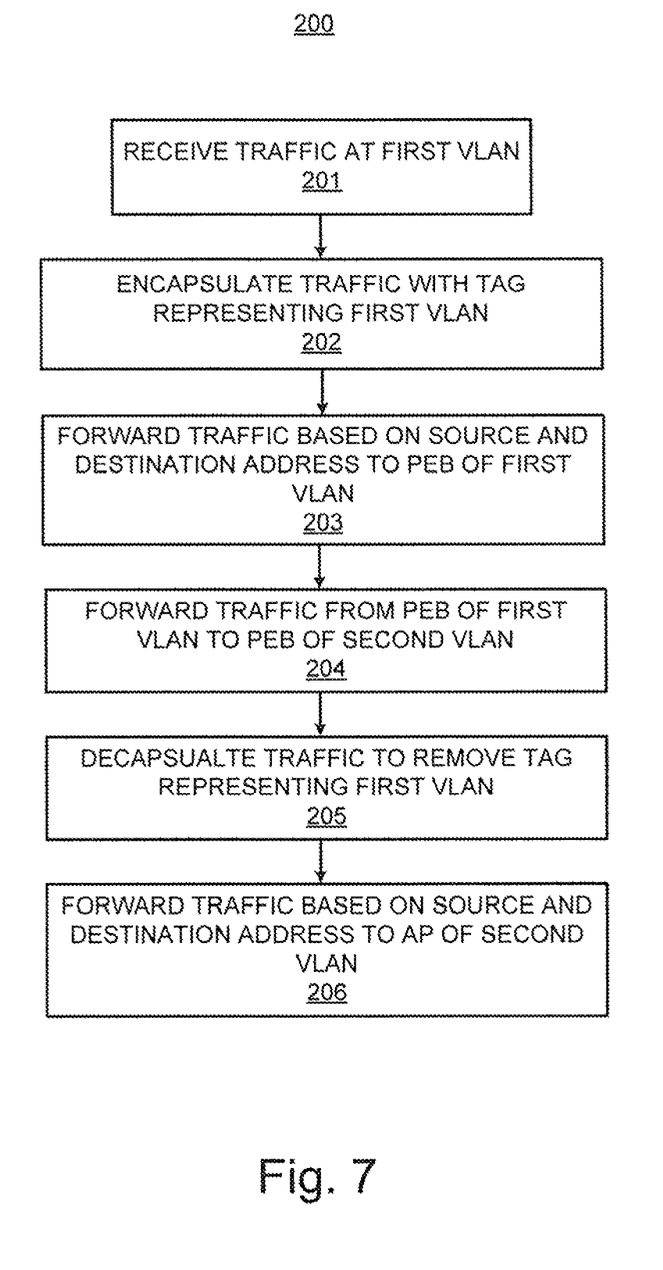
FIG. 7 illustrates a method for PBNC, according to an example of the present disclosure.

FIG. 7 illustrates a flowchart of a method 200 for provider bridged network communication, corresponding to the example of the provider bridged network communication system 100 whose construction is described in detail above. The method 200 may be implemented on the provider bridged network communication system 100 with reference to FIG. 1 by way of example and not limitation. The method 200 may be practiced in other systems.

Referring to FIG. 7, for the method 200, at block 201, traffic including a source and a destination address at a first VLAN is received for redirection to a second VLAN. For example, referring to FIG. 1, the C-VLAN control module 101 provides C-VLAN functionality for a VLAN, for example, to receive and process traffic 102. Further, referring to the example of FIG. 6, for traffic from the user-P to the user-Q (i.e., from user-P→user-Q), initially, at 178, the user-P generates a packet (i.e., PACKET 1) with C-TAG (i.e., the VLAN 2), source MAC (i.e., MAC-P), and destination MAC (i.e., MAC-Q). The traffic is received at the AP-5 of VLAN 5. For traffic received at AP-5 of VLAN 5, the traffic may be tested to determine if it belongs to a local C-VLAN (e.g., VLAN 5) or a remote C-VLAN (e.g., VLAN 2). If the traffic belongs to (i.e., is a member of) a remote C-VLAN (e.g., VLAN 2), this membership triggers the encapsulation at block 202.

At block 202, the traffic is encapsulated with a tag representing the first VLAN. For example, referring to FIG. 1, the AP control module 106 monitors and controls the functionality of an AP, for example, to retrieve permanent registration information for a user from a home VLAN, to determine dynamic association information of mobile users, and to encapsulate traffic from a visiting user with an appropriate S-TAG. Further, referring to the example of FIG. 6, at 179, the AP-5 receives PACKET 1 and encapsulates it with S-TAG (i.e., VLAN 5).

At block 203, the traffic is forwarded based on the source and the destination address to a PEB of the first VLAN. Alternatively, if the traffic is encapsulated as in block 202, the traffic is forwarded based on the encapsulation, and the source and the destination address, to the PEB of the first VLAN. For example, referring to FIG. 1, the S-VLAN control module 103 provides S-VLAN functionality for a VLAN, for example, to forward traffic 104 from one VLAN to another, which thus provides traffic redirection. The PEB control module 105 monitors and controls the functionality of a PEB, for example, to bridge different VLANs. In one example, the first VLAN is a S-VLAN and the second VLAN is a C-VLAN, and the S-VLAN forwards the traffic to the C-VLAN. In another example, each of the VLANs performs dual functions of a C-VLAN for home users and a S-VLAN for visiting users. Further, referring to the example of FIG. 6, at 180, the encapsulated packet (i.e., PACKET 2) is subsequently forwarded to the PEB-5. Since VLAN 5 treats PACKET 2 based on the S-TAG and the pair of MAC addresses (i.e., MAC-P and MAC-Q), VLAN 5 effectively becomes the service VLAN for PACKET 1.

At block 204, the traffic is forwarded from the PEB of the first VLAN to a PEB of the second VLAN. For example, referring to the example of FIG. 6, from 180 to 181, PEB-5 receives PACKET 2, and forwards PACKET 2 to PEB-2.

At block 205, the traffic is decapsulated to remove the tag representing the first VLAN. For example, referring to the example of FIG. 6, PEB-2 receives PACKET 2, and decapsulates it to PACKET 1, the original format by removing the S-TAG (i.e., VLAN 5).

At block 206, the traffic is forwarded based on the source and the destination address to an AP of the second VLAN. For example, referring to the example of FIG. 6, at 182, PEB-2 forwards PACKET 2 in its original format to AP-2. At 183, AP-2 receives PACKET 1 and forwards it to user-Q, and user-Q receives PACKET 1.

Figure 8:
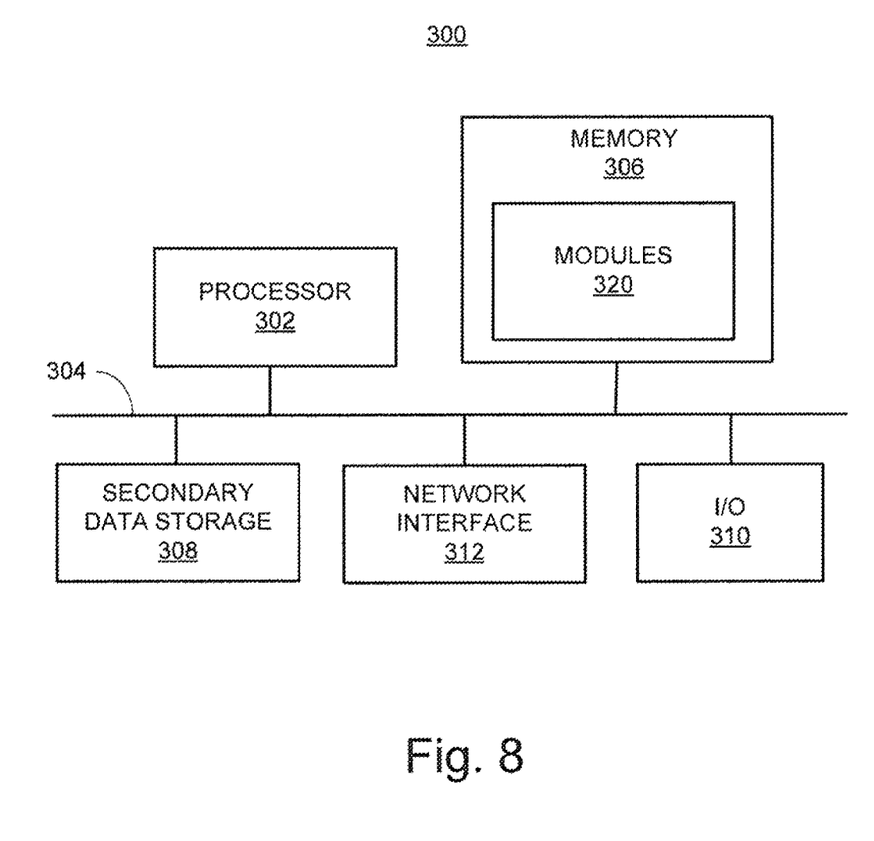
FIG. 8 illustrates a computer system, according to an example of the present disclosure.

FIG. 8 shows a computer system that may be used with the examples described herein. The computer system represents a generic platform that includes components that may be in a server or another computer system. The computer system may be used as a platform for the system 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 302 that may implement or execute machine readable instructions performing some or all of the methods, functions and other processes described herein. Commands and data from the processor 302 are communicated over a communication bus 304. The computer system also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include modules 320 including machine readable instructions residing in the memory 306 during runtime and executed by the processor 302. The modules 320 may include the modules 101, 103, 105 and 106 of the system shown in FIG. 1.

The computer system may include an I/O device 310, such as a keyboard, a mouse, a display, etc. The computer system may include a network interface 312 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for provider bridged network communication, the method comprising:
   receiving traffic including a source and a destination address at a first virtual local area network (VLAN) for redirection to a second VLAN;
   encapsulating the traffic with a tag representing the first VLAN;
   forwarding the encapsulated traffic based on the encapsulation, and the source and the destination address to a provider edge bridge (PEB) of the first VLAN;
   forwarding, by a processor, the encapsulated traffic from the PEB of the first VLAN to a PEB of the second VLAN;
   decapsulating the traffic to remove the tag representing the first VLAN; and
   forwarding the decapsulated traffic based on the source and the destination address to an access point (AP) of the second VLAN.

2. The method of claim 1, wherein receiving the traffic further comprises:
   receiving the traffic at an access point (AP) of the first VLAN.

3. The method of claim 1, further comprising:
   using an access point (AP) of the first VLAN to encapsulate the traffic.

4. The method of claim 1, further comprising:
   using the PEB of the second VLAN to decapsulate the traffic.

5. The method of claim 1, wherein the source and destination addresses are media access control (MAC) addresses.

6. The method of claim 1, wherein the first VLAN is a service VLAN (S-VLAN) and the second VLAN is a customer VLAN (C-VLAN), and the S-VLAN forwards the traffic to the C-VLAN.

7. The method of claim 1, wherein each of the VLANs perform dual functions of a customer VLAN (C-VLAN) for home users and a service VLAN (S-VLAN) for visiting users.

8. The method of claim 1, further comprising:
   using an access point (AP) to retrieve permanent registration information for a user from a home VLAN.

9. The method of claim 1, further comprising:
   using an access point (AP) to determine dynamic association information of mobile users.

10. A provider bridged network communication system comprising:
    a memory storing a module comprising machine readable instructions to:
        receive traffic including a source and a destination address at a first virtual local area network (VLAN) for redirection to a second VLAN;
        encapsulate the traffic with a tag representing the first VLAN;
        forward the encapsulated traffic based on the encapsulation, and the source and the destination address, to a provider edge bridge (PEB) of the first VLAN; and
        forward the encapsulated traffic from the PEB of the first VLAN to a PEB of the second VLAN;
        decapsulate the encapsulated traffic to remove the tag representing the first VLAN; and
        forward the decapsulated traffic based on the source and the destination address to an access point (AP) of the second VLAN; and
    a processor to implement the module.

11. The system of claim 10, further comprising machine readable instructions to:
    use an AP of the first VLAN to encapsulate the traffic; and
    use the PEB of the second VLAN to decapsulate the traffic.

12. The system of claim 10, wherein the first VLAN is a service VLAN (S-VLAN) and the second VLAN is a customer VLAN (C-VLAN), and the S-VLAN forwards the encapsulated traffic to the C-VLAN.

13. The system of claim 10, wherein each of the VLANs perform dual functions of a customer VLAN (C-VLAN) for home users and a service VLAN (S-VLAN) for visiting users.

14. A non-transitory computer readable medium having stored thereon machine readable instructions for provider bridged network communication, the machine readable instructions when executed cause a computer system to:
    receive traffic including a source and a destination address at a first virtual local area network (VLAN) for redirection to a second VLAN;
    encapsulate the traffic with a tag representing the first VLAN;
    forward the encapsulated traffic based on the encapsulation, and the source and the destination address, to a provider edge bridge (PEB) of the first VLAN;
    forward the encapsulated traffic from the PEB of the first VLAN to a PEB of the second VLAN;
    decapsulate the encapsulated traffic to remove the tag representing the first VLAN; and
    forward, by a processor, the traffic decapsulated traffic based on the source and the destination address to an access point (AP) of the second VLAN.

15. The non-transitory computer readable medium of claim 14, further comprising machine readable instructions to cause the computer system to:
    use an AP of the first VLAN to encapsulate the traffic; and
    use the PEB of the second VLAN to decapsulate the traffic.

16. The non-transitory computer readable medium of claim 14, wherein the first VLAN is a service VLAN (S-VLAN) and the second VLAN is a customer VLAN (C-VLAN), and the S-VLAN forwards the encapsulated traffic to the C-VLAN.

17. The non-transitory computer readable medium of claim 14, wherein each of the VLANs perform dual functions of a customer VLAN (C-VLAN) for home users and a service VLAN (S-VLAN) for visiting users.

* * * * *